United States Patent
Yamaguchi et al.

(10) Patent No.: US 11,820,917 B2
(45) Date of Patent: Nov. 21, 2023

(54) COATING COMPOSITION CONTAINING SILANE COMPOUND HAVING NITROGEN-CONTAINING RING

(71) Applicant: NISSAN CHEMICAL CORPORATION, Tokyo (JP)

(72) Inventors: Masato Yamaguchi, Funabashi (JP); Tomoki Furukawa, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 451 days.

(21) Appl. No.: 16/769,823

(22) PCT Filed: Dec. 10, 2018

(86) PCT No.: PCT/JP2018/045337
§ 371 (c)(1),
(2) Date: Jun. 4, 2020

(87) PCT Pub. No.: WO2019/117088
PCT Pub. Date: Jun. 20, 2019

(65) Prior Publication Data
US 2020/0369895 A1   Nov. 26, 2020

(30) Foreign Application Priority Data
Dec. 11, 2017   (JP) .................................. 2017-237115

(51) Int. Cl.
| | | |
|---|---|---|
| C09D 7/62 | (2018.01) | |
| G02B 1/14 | (2015.01) | |
| C09D 183/08 | (2006.01) | |
| C08G 77/26 | (2006.01) | |
| G02B 1/11 | (2015.01) | |

(52) U.S. Cl.
CPC ............. C09D 7/62 (2018.01); C09D 183/08 (2013.01); G02B 1/11 (2013.01); G02B 1/14 (2015.01); C08G 77/26 (2013.01)

(58) Field of Classification Search
None
See application file for complete search history.

(56) References Cited

U.S. PATENT DOCUMENTS

| | | | |
|---|---|---|---|
| 4,874,858 A | 10/1989 | Magistro | |
| 2002/0010273 A1 | 1/2002 | Matsumura et al. | |
| 2010/0316953 A1* | 12/2010 | Suwa ................... | C09D 183/08 548/406 |
| 2014/0162069 A1 | 6/2014 | Fukushima et al. | |
| 2014/0199554 A1 | 7/2014 | Koyama et al. | |
| 2019/0185678 A1 | 6/2019 | Murakami et al. | |
| 2022/0135814 A1 | 5/2022 | Koyama et al. | |

FOREIGN PATENT DOCUMENTS

| | | | | |
|---|---|---|---|---|
| CN | 1036577 | A | 10/1989 | |
| EP | 1 895 333 | A1 | 3/2008 | |
| EP | 2 239 301 | A1 | 10/2010 | |
| EP | 3101075 | B1 * | 10/2018 | ............. B32B 27/00 |
| JP | S52-16586 | A | 2/1977 | |
| JP | S53-111336 | A | 9/1978 | |
| JP | S55-13747 | A | 1/1980 | |
| JP | S62-151801 | A | 7/1987 | |
| JP | S63-275682 | A | 11/1988 | |
| JP | S64-54021 | A | 3/1989 | |
| JP | H10-306258 | A | 11/1998 | |
| JP | 2001-123115 | A | 5/2001 | |
| JP | 2001123115 | A * | 5/2001 | ............. B01J 13/0008 |
| JP | 2001-271185 | A | 10/2001 | |
| JP | 2001-348528 | A | 12/2001 | |
| JP | 2003-138211 | A | 5/2003 | |
| JP | 2013-500378 | A | 1/2013 | |
| JP | 2014-114364 | A | 6/2014 | |
| JP | 2015-040223 | A | 3/2015 | |
| JP | 2016-068423 | A | 5/2016 | |
| JP | 2016-121348 | A | 7/2016 | |
| KR | 10-2015-0124828 | A | 11/2015 | |

(Continued)

OTHER PUBLICATIONS

Jul. 5, 2021 Office Action issued in Chinese Patent Application No. 201880088728.0.
Dec. 3, 2021 Office Action issued in Chinese Patent Application No. 201880088728.0.
Jul. 23, 2021 Extended European Search Report issued in European Patent Application No. 18888449.8.
Mar. 12, 2019 Written Opinion of the International Searching Authority issued in PCT/JP2018/045337.

(Continued)

*Primary Examiner* — Joshua D Zimmerman
(74) *Attorney, Agent, or Firm* — Oliff PLC

(57) ABSTRACT

A coating composition can form a cured film which has excellent transparency, hardness, abrasion resistance, adhesion, and weather resistance. The stability of the composition itself is excellent. An optical member has a cured film formed from the coating composition. The coating composition includes a component (S): organosilicon compounds and/or a silicon-containing substance which is a hydrolyzate thereof; and a component (T): modified metal oxide colloid particles having an average particle diameter of 2 to 100 nm, wherein the organosilicon compounds of the component (S) include a component (S1): an organosilicon compound which includes at least one hydrolyzable group selected from the group made of an alkoxy group, an aryloxy group, an aralkyloxy group and an acyloxy group and does not have a nitrogen-containing heterocyclic structure, and a component (S2): an organosilicon compound having a nitrogen-containing heterocyclic group, and an optical member having a cured film formed from the coating composition.

14 Claims, No Drawings

(56) References Cited

FOREIGN PATENT DOCUMENTS

| WO | 2007/064108 A1 | 6/2007 |
| WO | 2012/165620 A1 | 12/2012 |
| WO | 2015/115377 A1 | 8/2015 |
| WO | 2017/170275 A1 | 10/2017 |

OTHER PUBLICATIONS

Mar. 12, 2019 International Search Report issued in International Patent Application No. PCT/JP2018/045337.
Oct. 12, 2022 Notice of Reason for Refusal issued in Japanese Patent Application No. 2019-559627.

\* cited by examiner

COATING COMPOSITION CONTAINING SILANE COMPOUND HAVING NITROGEN-CONTAINING RING

TECHNICAL FIELD

The present invention relates to a coating composition in which a film obtained by coating has excellent hardness, transparency, abrasion resistance, adhesion and weather resistance and which can form a cured film beneficial for an optical member such as an eyeglass lens, and an optical member.

BACKGROUND ART

Plastic molded products are used in large amounts due to their advantages such as being lightweight, ease of processability, and impact resistance, but they have disadvantages such as being easily scratched due to insufficient hardness, solvents readily penetrating thereinto, adsorbing dust due to charging, and insufficient heat resistance. Therefore, when plastic molded products are used as spectacle lenses, window materials, and the like, they have the above practical disadvantages as compared with inorganic glass molded products. Thus, application of a protective coat (protective coating) to plastic molded products has been proposed. Actually, many types of coating compositions used for protective coats have been proposed.

A coating composition which includes an organosilicon compound or its hydrolyzate as a main component (a resin component or a coating film forming component) has been used for spectacle lenses to provide a hard coating similar to an inorganic type (Patent Document 1).

Since such a coating composition still has unsatisfactory abrasion resistance, a composition obtained by additionally adding a silicon dioxide sol dispersed in a colloid form thereto has been proposed, and this has been put to practical use for spectacle lenses (Patent Document 2).

Incidentally, most conventional plastic spectacle lenses have been produced by cast polymerization of diethylene glycol bisallyl carbonate. However, since these lenses have a refractive index of about 1.50, which is lower than a refractive index of about 1.52 of a glass lens, in the case of myopic lenses, there is a disadvantage that the thickness of the edge becomes thicker. Therefore, in recent years, the development of monomers having a higher refractive index than diethylene glycol bisallyl carbonate has been progressed and high refractive index resin materials have been proposed (Patent Documents 3 and 4).

Methods in which a colloidal dispersion of Sb or Ti metal oxide fine particles is used in a coating material for such high refractive index resin lenses have been proposed (Patent Documents 5 and 6).

In addition, a coating composition which includes a silane coupling agent and particles (C) which include metal oxide colloid particles (A) having a primary particle diameter of 2 to 60 nm as nuclei and with the nuclei surface coated with a coating (B) composed of acidic oxide colloid particles, in which a proportion of (C) contained is 2 to 50% by mass in terms of metal oxides, and which is composed of a stable modified metal oxide sol having a primary particle diameter of 2 to 100 nm has been disclosed. In addition, regarding specific examples of colloid particles used, modified titanium oxide-zirconium oxide-stannic oxide composite colloids coated with alkylamine-containing antimony pentoxide have been disclosed (Patent Document 7). In addition, titanium oxide-stannic oxide-zirconium oxide composite colloids stabilized with an alkylamine or oxycarboxylic acid have been disclosed (Patent Document 8).

PRIOR ART DOCUMENTS

Patent Documents

Patent Document 1: Japanese Unexamined Patent Application Publication No. S52-16586
Patent Document 2: Japanese Unexamined Patent Application Publication No. S53-111336
Patent Document 3: Japanese Unexamined Patent Application Publication No. S55-13747
Patent Document 4: Japanese Unexamined Patent Application Publication No. S64-54021
Patent Document 5: Japanese Unexamined Patent Application Publication No. S62-151801
Patent Document 6: Japanese Unexamined Patent Application Publication No. S63-275682
Patent Document 7: Japanese Unexamined Patent Application Publication No. 2001-123115
Patent Document 8: Japanese Unexamined Patent Application Publication No. H10-306258

SUMMARY OF THE INVENTION

Problem to be Solved by the Invention

The coating compositions to which a silicon dioxide sol is added that have been proposed have problems that interference fringes occur in the coating film and lenses have poor appearances.

In addition, in the case of a coating composition using a titanium oxide sol, there is a problem in compatibility of the titanium oxide sol with a silane coupling agent or its hydrolyzate, and the stability is poor, and also there is a problem that a coating layer (cured film) formed from the coating composition becomes blue colored because titanium oxide is photoexcited due to ultraviolet radiation. In addition, the high refractive index resin lenses have problems such as poor adhesion to the coating composition and peeling off of the film.

An object of the present invention is to provide a coating composition which is a composition that can form a cured film which has not only high transparency without causing interference fringes in a coating film but also has excellent hardness, abrasion resistance, adhesion, and weather resistance even when applied to a high refractive index plastic molded product having a refractive index $n_D$ of 1.58 to 1.76, and in which the stability of the composition itself is excellent, and an optical member having a cured film formed from the coating composition.

The inventors have conducted extensive studies in order to address the above problems, and as a result, found that, particularly, when an organosilicon compound having a cyclic structure containing nitrogen atoms is used as a binder, it is possible to form a cured film having not only high transparency and abrasion resistance but also excellent hardness, adhesion and weather resistance, and completed the present invention.

Specifically, a first aspect of the present invention relates to a coating composition, comprising
 a component (S): organosilicon compounds and/or a silicon-containing substance which is a hydrolyzate thereof; and
 a component (T): modified metal oxide colloid particles having an average particle diameter of 2 to 100 nm, wherein the organosilicon compounds of the component (S) include a component (S1): an organosilicon compound which includes at least one hydrolyzable group selected from the group consisting of an alkoxy group, an aryloxy group, an aralkyloxy group and an acyloxy group and does not have a nitrogen-containing heterocyclic structure, and a component (S2): an organosilicon compound having a nitrogen-containing heterocyclic group.

A second aspect relates to the coating composition according to the first aspect, wherein the component (S2) is an organosilicon compound having a nitrogen-containing heterocyclic group containing 1 to 3 nitrogen atoms.

A third aspect relates to the coating composition according to the second aspect, wherein the component (S2) is an organosilicon compound having a nitrogen-containing heterocyclic group which contains 1 to 3 nitrogen atoms and has 5 to 30 ring-forming atoms.

A fourth aspect relates to the coating composition according to the first aspect or the second aspect, wherein the component (S2) is a compound of the following Formula (III):

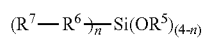  Formula (III)

(in Formula (III), $R^5$ is a $C_{1-8}$ alkyl group, alkoxyalkyl group, or acyl group, $R^6$ is a methylene group or a $C_{2-20}$ alkylene group, $R^7$ is a nitrogen-containing heterocyclic group containing 1 to 3 nitrogen atoms, and n is an integer of 1 to 3).

A fifth aspect relates to the coating composition according to the fourth aspect, wherein $R^7$ is a nitrogen-containing heterocyclic group which contains 1 to 3 nitrogen atoms and has 5 to 30 ring-forming atoms.

A sixth aspect relates to the coating composition according to any one of the first aspect to the fifth aspect, wherein a nitrogen-containing heterocycle in the nitrogen-containing heterocyclic group is a pyrrole ring, a pyrrolidone ring, an indole ring, an indoline ring, a carbazole ring, a pyridine ring, a piperidine ring, a pyrimidine ring, a quinoline ring, a pyrazole ring, an imidazole ring, an imidazoline ring, an imidazolidine ring, a benzimidazole ring, a triazole ring, a benzotriazole ring, or a triazine ring.

A seventh aspect relates to the coating composition according to any one of the first aspect to the sixth aspect, wherein the component (S1) is at least one organosilicon compound selected from the group consisting of compounds of the following General Formula (I) and compounds of the following General Formula (II):

 (I)

(wherein, $R^1$ and $R^3$ are each independently an alkyl group, an aryl group, a halogenated alkyl group, a halogenated aryl group or an alkenyl group, or an organic group which is a monovalent organic group having an epoxy group, an acryloyl group, a methacryloyl group, a mercapto group, a ureido group, an amino group or a cyano group and which is bonded to a silicon atom via an Si—C bond, $R^2$ is a $C_{1-8}$ alkyl group, aryl group, aralkyl group, alkoxyalkyl group, or acyl group, and a and b are each independently an integer of 0, 1, or 2, and a+b is an integer of 0, 1, or 2)

 (II)

(wherein, $R^4$ is a $C_{1-5}$ alkyl group, X is a $C_{1-4}$ alkyl group or acyl group, Y is a methylene group or a $C_{2-20}$ alkylene group, and c is an integer of 0 or 1).

An eighth aspect relates to the coating composition according to any one of the first aspect to the seventh aspect, wherein a mass proportion of the component (S2) contained is 3 to 1,200 parts by mass with respect to a total mass of 100 parts by mass of the component (S1).

A ninth aspect relates to the coating composition according to any one of the first aspect to the eighth aspect, wherein a proportion of the component (S) contained is 25 to 300 parts by mass with respect to 100 parts by mass of the modified metal oxide colloid particles of the component (T).

A tenth aspect relates to the coating composition according to any one of the first aspect to the ninth aspect, wherein the component (T) is modified metal oxide colloid particles (C) having an average particle diameter of 2 to 100 nm, and the colloid particles (C) include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

An eleventh aspect relates to the coating composition according to the tenth aspect, wherein the component (T) is modified metal oxide colloid particles (C) in which one or more intermediate thin film layers formed of any one of a single oxide of at least one of atoms selected from the group consisting of Si, Al, Sn, Zr, Sb, Nb, Ta and W, a composite oxide of two or more of atoms selected from the same group, or a mixture of the single oxide and the composite oxide are interposed between the metal oxide colloid particles (A) serving as nuclei and the inorganic oxide colloid particles (B) serving as a coating.

A twelfth aspect relates to the coating composition according to the tenth aspect or the eleventh aspect, wherein the modified metal oxide colloid particles (C) are obtained by bonding the organosilicon compound of the component (S1) to at least a part of the surface.

A thirteenth aspect relates to the coating composition according to the twelfth aspect, wherein the organosilicon compound is an organosilicon compound having a ureido group.

A fourteenth aspect relates to the coating composition according to any one of the tenth aspect to the thirteenth aspect, wherein the metal oxide colloid particles (A) are composite oxide colloid particles which contain a Ti oxide as a main component and further contain an oxide of one or more metals selected from the group consisting of Fe, Cu, Zn, Y, Zr, Nb, Mo, In, Sn, Sb, Ta, W, Pb, Bi and Ce.

A fifteenth aspect relates to the coating composition according to any one of the tenth aspect to the fourteenth aspect, wherein the inorganic oxide colloid particles (B) are colloid particles of an oxide of one or two or more atoms selected from the group consisting of Si, Al, Sn, Zr, Mo, Sb and W.

A sixteenth aspect relates to the coating composition according to any one of the first aspect to the fifteenth aspect, further comprising one or two or more curing catalysts selected from the group consisting of a metal salt, a metal alkoxide and a metal chelate compound.

A seventeenth aspect relates to an optical member having a cured film formed from the coating composition according to any one of the first aspect to the sixteenth aspect on the surface of an optical substrate.

An eighteenth aspect relates to the optical member according to the seventeenth aspect, characterized by further comprising an anti-reflective coating on the surface of the cured film formed on the surface of the optical substrate.

Effects of the Invention

The coating composition of the present invention can form a cured film having excellent stability, and excellent abrasion resistance, surface hardness, transparency, weather resistance and adhesion to a substrate (base material), and particularly form a coating layer having excellent adhesion to a highly refractive resin lens.

The optical member of the present invention has excellent abrasion resistance, surface hardness, transparency, and weather resistance and also has excellent adhesion between a cured film which is a cured product of the coating composition and a substrate, and even when a high refractive index member having a refractive index of 1.58 or more is used, an optical member having high transparency and a favorable appearance without observable interference fringes can be obtained.

Therefore, the optical member having a cured film produced from the coating composition of the present invention can be used for camera lenses, vehicle window glass, and optical filters attached to liquid crystal displays or plasma displays in addition to spectacle lenses.

MODES FOR CARRYING OUT THE INVENTION

[Coating Composition]

A coating composition of the present invention (also referred to as a coating solution) includes a component (S): organosilicon compounds and/or a silicon-containing substance which is a hydrolyzate thereof, and a component (T): modified metal oxide colloid particles having an average particle diameter of 2 to 100 nm.

Components constituting the coating composition of the present invention will be described below in detail.

<<Component (S)>>

The component (S) according to the present invention is an organosilicon compound, and/or a silicon-containing substance which is a hydrolyzate thereof. Specifically, the organosilicon compound includes a component (S1): an organosilicon compound which includes at least one hydrolyzable group selected from the group consisting of an alkoxy group, an aryloxy group, an aralkyloxy group and an acyloxy group and does not have a nitrogen-containing heterocyclic structure and a component (S2): an organosilicon compound having a nitrogen-containing heterocyclic group, which will be described below.

[Component (S1)]

The component (S1) is an organosilicon compound which includes at least one hydrolyzable group selected from the group consisting of an alkoxy group, an aryloxy group, an aralkyloxy group and an acyloxy group and does not have a nitrogen-containing heterocyclic structure. For example, the nitrogen-containing ring structure indicates a nitrogen-containing heterocycle in a nitrogen-containing heterocyclic group contained in the component (S2) to be described below, that is, the component (S1) indicates an organosilicon compound that does not have a heterocyclic structure (hetero ring structure) containing nitrogen atoms as heteroatoms but may have a heterocyclic structure containing heteroatoms other than nitrogen atoms.

In particular, the component (S1) is preferably at least one organosilicon compound selected from the group consisting of compounds of the following General Formula (I) and compounds of the following General Formula (II).

<Compound of General Formula (I)>

$$(R^1)_a(R^3)_b Si(OR^2)_{4-(a+b)} \quad (I)$$

wherein, $R^1$ and $R^3$ are each independently an alkyl group, an aryl group, a halogenated alkyl group, a halogenated aryl group or an alkenyl group, or an organic group which is a monovalent organic group having an epoxy group, an acryloyl group, a methacryloyl group, a mercapto group, a ureido group, an amino group or a cyano group and which is bonded to a silicon atom via an Si—C bond, $R^2$ is a $C_{1-8}$ alkyl group, aryl group, aralkyl group, alkoxyalkyl group, or acyl group, and a and b are each independently an integer of 0, 1, or 2, and a+b is an integer of 0, 1, or 2.

Organosilicon compounds of General Formula (I) include an organosilicon compound in which $R^1$ and $R^3$ are the same organic group or different organic groups and an organosilicon compound in which a and b are the same integer or different integers.

Examples of organosilicon compounds of General Formula (I) include tetramethoxysilane, tetraethoxysilane, tetra n-propoxysilane, tetraisopropoxysilane, tetra n-butoxysilane, tetraacetoxysilane, methyltrimethoxysilane, methyltripropoxysilane, methyltributoxysilane, methyltriacetoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δglycidoxybutyltrimethoxysilane, δglycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, 3-ureidopropyltriethoxysilane, ureidomethyltrimethoxysilane, 2-ureidoethyltrimethoxysilane, 3-ureidopropyltrimethoxysilane, ureidomethyltriethoxysilane, 2-ureidoethyltriethoxysilane, 3-ureidopropyltriethoxysilane, methylvinyldimethoxysilane, and methylvinyldiethoxysilane, and these can be used alone or two or more thereof can be used in combination.

<Compound of General Formula (II)>

wherein,
R$^4$ is a C$_{1-5}$ alkyl group,
X is a C$_{1-4}$ alkyl group or acyl group,
Y is a methylene group or a C$_{2-20}$ alkylene group, and
c is an integer of 0 or 1.

Examples of organosilicon compounds of Formula (II) include methylenebismethyldimethoxysilane, ethylenebisethyldimethoxysilane, propylenebisethyldiethoxysilane, and butylenebismethyldiethoxysilane, and these can be used alone or two or more thereof can be used in combination.

The component (S1) is preferably an organosilicon compound of General Formula (I). In particular, an organosilicon compound of General Formula (I) that satisfies conditions in which any of R$^1$ and R$^3$ is an organic group including an epoxy group, R$^2$ is an alkyl group or an aryl group, and more preferably an alkyl group, and a and b are each 0 or 1, and a+b is 1 or 2 is preferable.

Preferable examples of organosilicon compounds of General Formula (I) include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δglycidoxybutyltrimethoxysilane, δglycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, and γ-glycidoxypropylvinyldiethoxysilane. More preferably, γ-glycidoxypropyltrimethoxysilane, γ-glycidoxypropylmethyldimethoxysilane, and γ-glycidoxypropylmethyldiethoxysilane, and these can be used alone or in combination.

In addition, when γ-glycidoxypropyltrimethoxysilane, γ-glycidoxypropylmethyldimethoxysilane, or γ-glycidoxypropylmethyldiethoxysilane is used, additionally, it is preferably used together with a tetrafunctional compound in which a+b=0 in General Formula (I) is satisfied. Examples of tetrafunctional compounds include tetramethoxysilane, tetraethoxysilane, tetraisopropoxysilane, tetra n-propoxysilane, tetra n-butoxysilane, tetra tert-butoxysilane, and tetra sec-butoxysilane.

[Component (S2)]

The component (S2) is an organosilicon compound having a nitrogen-containing heterocyclic group, and preferably an organosilicon compound having a nitrogen-containing heterocyclic group containing 1 to 3 nitrogen atoms.

In particular, the component (S2) is preferably a compound of the following Formula (III):

Formula (III)

(in Formula (III),
R$^5$ is a C$_{1-8}$ alkyl group, alkoxyalkyl group, or acyl group,
R$^6$ is a methylene group or a C$_{2-20}$ alkylene group,
R$^7$ is a nitrogen-containing heterocyclic group containing 1 to 3 nitrogen atoms, and
n is an integer of 1 to 3).

In the above, the nitrogen-containing heterocyclic group containing 1 to 3 nitrogen atoms is preferably a nitrogen-containing heterocyclic group which contains 1 to 3 nitrogen atoms and has 5 to 30 ring-forming atoms, and more preferably a nitrogen-containing heterocyclic group which has 5 to 10 ring-forming atoms, and particularly, 5 to 8 ring-forming atoms. Here, the number of ring-forming atoms refer to the number of atoms constituting the ring itself of a compound (for example, a single ring compound, a fused ring compound, a crosslinked compound, a carbocyclic compound, or a heterocyclic compound) with a structure in which atoms are bonded in a ring shape (for example, a single ring, a fused ring, or a ring assembly) and atoms that do not form a ring (for example, hydrogen atoms terminating a bond of atoms that form a ring) and atoms included in substituents when the ring is substituted with substituents are not included in the number of ring-forming atoms.

Examples of nitrogen-containing heterocycles in the nitrogen-containing heterocyclic group include a pyrrole ring, a pyrrolidone ring, an indole ring, an indoline ring, a carbazole ring, a pyridine ring, a piperidine ring, a pyrimidine ring, a quinoline ring, a pyrazole ring, an imidazole ring, an imidazoline ring, an imidazolidine ring, a benzimidazole ring, a triazole ring, a benzotriazole ring, and a triazine ring.

Examples of "nitrogen-containing heterocyclic group containing 1 to 3 nitrogen atoms" in the definition of $R^7$ in Formula (III) include a monovalent group derived from the nitrogen-containing heterocycle.

$R^6$ is preferably a $C_{2-10}$ alkylene group, that is, an alkylene group having 2, 3, 4, 5, 6, 7, 8, 9 or 10 carbon atoms.

In addition, examples of a preferable nitrogen-containing heterocyclic group for $R^7$ include a benzimidazole group and a benzotriazolyl group.

In addition, n is preferably 1.

[Component (S)]

In the component (S) in the coating composition of the present invention, a mass proportion of the component (S2) contained is preferably 3 to 1,200 parts by mass, 3 to 100 parts by mass, or 3 to 50 parts by mass with respect to a total mass of 100 parts by mass of the component (S1).

Here, "hydrolyzate of an organosilicon compound" in the component (S) used in the coating composition of the present invention refers to an organosilicon compound selected from the group consisting of compounds of General Formulae (I) and (II) and a compound in which an organosilicon compound of General Formula (III) is hydrolyzed and thus some or all of $R^2$ (Formula (I)), X (Formula (II)), and $R^5$ (Formula (III)) are substituted with hydrogen atoms. These hydrolyzates of the organosilicon compounds of General Formula (I), General Formula (II), and General Formula (III) can be used alone or two or more thereof can be used in combination. The hydrolysis is performed by adding an acidic aqueous solution such as a hydrochloric acid aqueous solution, a sulfuric acid aqueous solution, and an acetic acid aqueous solution to the organosilicon compound and stirring the mixture.

<<Component (T)>>

The component (T) contained in the coating composition of the present invention is modified metal oxide colloid particles having an average particle diameter of 2 to 100 nm.

The component (T) is preferably modified metal oxide colloid particles (C) having an average particle diameter of 2 to 100 nm, and the colloid particles (C) are colloid particles which include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

In the present invention, the average primary particle diameters of the metal oxide colloid particles (A) serving as nuclei, and the inorganic oxide colloid particles (B) serving as a coating are measured by observation using a transmission electron microscope. Additionally, the average particle diameter of the modified metal oxide colloid particles (C) in which the surface of the particles (A) serving as nuclei are coated with a coating composed of the particles (B) can be measured by a dynamic light scattering method (DLS method).

Here, when the surface of the metal oxide colloid particles (A) is coated with the inorganic oxide colloid particles (B), the value of the particle diameter of the obtained modified metal oxide colloid particles (C) can vary due to a reaction at the interface between the particles. Therefore, when the particle diameter of the modified metal oxide colloid particles (C) is evaluated according to the primary particle diameter measured by observation using a transmission electron microscope, the value may not always match the sum of average primary particle diameters of the metal oxide colloid particles (A) and the inorganic oxide colloid particles (B).

Hereinafter, in this specification, the particle diameter measured by observation using a transmission electron microscope will be referred to as an "average primary particle diameter" and the particle diameter measured by a dynamic light scattering method (DLS method) will be referred to as an "average particle diameter (dynamic light scattering method particle diameter)".

<Metal Oxide Colloid Particles (A)>

The metal oxide colloid particles (A) are particles having an average primary particle diameter of 2 to 60 nm.

Examples of such metal oxide colloid particles (A) include colloid particles of an oxide of at least one metal selected from the group consisting of Ti, Fe, Cu, Zn, Y, Zr, Nb, Mo, In, Sn, Sb, Ta, W, Pb, Bi and Ce. The metal oxide colloid particles (A) are colloid particles of an oxide of a metal having a valence of 2 to 6, and examples of forms of such a metal oxide include $TiO_2$, $Fe_2O_3$, CuO, ZnO, $Y_2O_3$, $ZrO_2$, $Nb_2O_5$, $MoO_3$, $In_2O_3$, $SnO_2$, $Sb_2O_5$, $Ta_2O_5$, $WO_3$, PbO, $Bi_2O_3$, and $CeO_2$. Here, these metal oxides may be used alone or a plurality of types thereof may be used in combination. Examples of a combining method include a method of mixing several types of the above metal oxides, a method of compositing the above metal oxides, and a method of converting the above metal oxides into a solid solution at an atomic level.

The metal oxide colloid particles (A) can be produced by a known method, for example, an ion exchange method, a peptization method, a hydrolysis method, or a reaction method. Examples of ion exchange methods include a method of treating an acidic salt of the metal with a hydrogen type ion exchange resin and a method of treating a basic salt of the metal with a hydroxyl group type anion exchange resin. Examples of peptization methods include a method in which a gel obtained by neutralizing an acidic salt of the metal with a base or neutralizing a basic salt of the metal with an acid is washed and then peptized with an acid or a base. Examples of hydrolysis methods include a method of hydrolyzing an alkoxide of the metal and a method in which a basic salt of the metal is hydrolyzed while heating and unnecessary acid is then removed. Examples of reaction methods include a method of causing the metal powder to react with an acid.

In a preferable aspect, the metal oxide colloid particles (A) are composite oxide colloid particles which contain a Ti oxide (titanium oxide) as a main component and further contain an oxide of at least one metal selected from the group consisting of Fe, Cu, Zn, Y, Zr, Nb, Mo, In, Sn, Sb, Ta, W, Pb, Bi and Ce. Here, "main component" in the particles (A) means that the component (Ti oxide) is contained in an essential amount of 50% by mass or more. When the content of titanium oxide is set to 50% by mass or more, an improvement in the refractive index in a cured film obtained using a composition containing these particles can be expected and the generation of interference fringes that can occur due to a refractive index of a substrate can be reduced.

Examples of the composite oxide colloid particles include $TiO_2$—$SnO_2$ composite oxide colloid particles in which $TiO_2$ particles and $SnO_2$ particles are chemically bonded at their interfaces to form a composite and $TiO_2$—$SnO_2$—$ZrO_2$ composite oxide colloid particles obtained by forming a solid solution of $TiO_2$, $SnO_2$, and $ZrO_2$ at an atomic level.

In addition, when the metal oxide colloid particles (A) are colloid particles of a composite oxide containing titanium oxide as a main component, the particles may be amorphous or anatase type, rutile type, or brookite type crystals. In addition, a perovskite type titanium compound such as barium titanate ($BaTiO_3$ or $BaO \cdot TiO_2$) may be used. In particular, the crystal type of colloid particles of a composite oxide containing titanium oxide as a main component is preferably a rutile type.

<Inorganic oxide colloid particles (B)>

The inorganic oxide colloid particles (B) are particles having an average primary particle diameter of 1 to 4 nm.

Examples of such inorganic oxide colloid particles (B) include colloid particles of an oxide of one or two or more atoms selected from the group consisting of Si, Al, Sn, Zr, Mo, Sb and W.

Examples of forms of an oxide (inorganic oxide) of the atoms may include $SiO_2$, $Al_2O_3$, $SnO_2$, $ZrO_2$, $MoO_3$, $Sb_2O_5$, and $WO_3$.

Here, these inorganic oxides may be used alone or in combination. Examples of a combining method include a method of mixing several types of the above inorganic oxides, a method of compositing the above inorganic oxides, and a method of converting the above inorganic oxides into a solid solution at an atomic level.

Examples thereof include $SnO_2$—$WO_3$ composite colloid particles in which $SnO_2$ particles and $WO_3$ particles are chemically bonded at their interfaces to form a composite, $SnO_2$—$SiO_2$ composite colloid particles in which $SnO_2$ particles and $SiO_2$ particles are chemically bonded at their interfaces to form a composite, $SnO_2$—$WO_3$—$SiO_2$ composite colloid particles, in which $SnO_2$ particles, $WO_3$ particles, and $SiO_2$ particle are chemically bonded at their interfaces to form a composite, $SnO_2$—$MoO_3$—$SiO_2$ composite colloid particles in which $SnO_2$ particles, $MoO_3$ particles, and $SiO_2$ particles are chemically bonded at their interfaces to form a composite, and $Sb_2O_5$—$SiO_2$ composite colloid particles in which $Sb_2O_5$ particles and $SiO_2$ particles are chemically bonded at their interfaces to form a composite.

The inorganic oxide colloid particles (B) can be produced by a known method, for example, an ion exchange method or an oxidation method. Examples of ion exchange methods include a method of treating an acidic salt of the atom with a hydrogen type ion exchange resin. Examples of oxidation methods include a method of causing an atomic or inorganic oxide powder to react with hydrogen peroxide.

<Modified Metal Oxide Colloid Particles (C)>

In the modified metal oxide colloid particles (C) (inorganic oxide colloid particle coating-metal oxide colloid particles) which include the metal oxide colloid particles (A) as nuclei and with the nuclei surface coated with a coating composed of the inorganic oxide colloid particles (B), the amount (mass ratio) of the inorganic oxide colloid particles (B) serving as a coating is preferably in a range of 0.01 to 1.0 with respect to the metal oxide colloid particles (A) serving as nuclei.

Here, the value of the average primary particle diameter of the inorganic oxide colloid particles (B) is preferably smaller than the value of the average primary particle diameter of the metal oxide colloid particles (A). It is thought that, in the modified metal oxide colloid particles (C), the surfaces of the metal oxide colloid particles (A) are coated with the inorganic oxide colloid particles (B) due to an electrostatic interaction. When an intermediate thin film layer (to be described below) is formed between the metal oxide colloid particles (A) and the inorganic oxide colloid particles (B), the intermediate thin film layer can cover the surfaces of the metal oxide colloid particles (A) in a solution state. Preferably, each layer of the metal oxide colloid particles (A), the inorganic oxide colloid particles (B) as well as of the intermediate thin film has different compositions (components) of metal oxides.

In order to obtain the modified metal oxide colloid particles (C), that is, colloid particles which include the metal oxide colloid particles (A) as nuclei and with the surface coated with a coating composed of the inorganic oxide colloid particles (B), a conventionally known method can be used.

For example, a method in which an aqueous sol containing the metal oxide colloid particles (A) serving as nuclei and an aqueous sol containing the inorganic oxide colloid particles (B) serving as a coating are mixed at a mass ratio of (B)/(A) of 0.01 to 1.0 in terms of their metal oxides and inorganic oxides, and this aqueous medium is then heated may be exemplified.

The mixing of the metal oxide colloid particles (A) and the inorganic oxide colloid particles (B) can be performed at a temperature of 0 to 100° C., preferably at room temperature to 60° C. Then, heating after the mixing is performed, for example, at 70 to 300° C.

The modified metal oxide colloid particles (C) obtained in the procedure are obtained in the form of an aqueous sol of the modified metal oxide colloid particles (C), and can be suitably used for a coating composition to be described below in the form of the aqueous sol or an organosol in which an aqueous medium of the sol is substituted with an organic solvent as will be described below.

<Intermediate Thin Film Layer>

As described above, in the modified metal oxide colloid particles (C), one or more intermediate thin film layers formed of any one of a single oxide of at least one of atoms selected from the group consisting of Si, Al, Sn, Zr, Sb, Nb, Ta and W, a composite oxide of two or more of atoms selected from the same group, and a mixture of the single oxide and the composite oxide may be interposed between the metal oxide colloid particles (A) serving as nuclei and the coating composed of the inorganic oxide colloid particles (B) covering the surfaces thereof. The intermediate thin film layer may be a single layer or multiple layers (two or more layers).

When at least one intermediate thin film layer is interposed between the metal oxide colloid particles (A) serving as nuclei and the inorganic oxide colloid particles (B) serving as a coating, it is possible to adjust a refractive index of the modified metal oxide colloid particles (C) and also it is possible to improve various physical properties such as light resistance, weather resistance of the coating obtained using the coating composition containing the colloid particles (C), and adhesion between the coating and the substrate. In addition, coloring of the modified metal oxide colloid particles (C) is suppressed and it is possible to improve transparency of the coating.

In addition, the number of intermediate thin film layers, and the thickness of the layer are not particularly limited as long as the amount (mass ratio) of the inorganic oxide colloid particles (B) serving as a coating with respect to the metal oxide colloid particles (A) serving as nuclei described above is in a range of 0.01 to 1.0.

In addition, particularly, the intermediate thin film layer is suitably made of at least one of silicon dioxide ($SiO_2$), antimony oxide ($Sb_2O_5$), aluminum oxide ($Al_2O_3$) and zirconium oxide ($ZrO_2$), and for example, silicon dioxide, antimony oxide, aluminum oxide or zirconium oxide may be laminated by each component to form a thin film layer, or may be combined into, for example, an antimony oxide-silicon dioxide complex, to form a thin film layer.

As an example, when silicon dioxide is included as an oxide constituting the intermediate thin film layer, it is possible to improve the stability of the sol of the modified metal oxide colloid particles (C) and it is possible to prolong the pot life of the coating composition to be described below. Therefore, it is possible to improve the hardness of a transparent film (cured film) obtained from the coating composition, it is possible to improve adhesion to an anti-reflective coating formed on the transparent film (cured film), and it is possible to improve weather resistance, light resistance, adhesion to the substrate, film hardness, abrasion resistance, flexibility, and the like. For example, when silicon dioxide, zirconium oxide and/or aluminum oxide are used for the intermediate thin film layer, it is possible to obtain the modified metal oxide colloid particles (C) that can form a transparent film (cured film) having excellent weather resistance, light resistance, adhesion to the substrate, film hardness, abrasion resistance, flexibility, and the like.

In addition, when zirconium oxide is used as an oxide constituting the intermediate thin film layer, discoloration of the obtained modified oxide colloid particles (C) can be suppressed. This has a problem that titanium oxide (titanium oxide sol) having a small average primary particle diameter causes a reaction in which titanium oxide is partially reduced from $TiO_2$ to TiO due to ultraviolet radiation, and dark blue is exhibited as described above. Also, in the case of stannic oxide ($SnO_2$), it has a problem that, when it is used as a sol having an average primary particle diameter of 100 nm or less, and particularly 30 nm or less, since a reaction in which $SnO_2$ is partially reduced to SnO is caused due to ultraviolet radiation, brown or blue-green is exhibited. In this case, when zirconium oxide is present in the intermediate thin film layer of the modified oxide colloid particles (C), reduction of titanium oxide or stannic oxide constituting oxide colloid particles to TiO or SnO can be suppressed, and discoloration can be suppressed.

When the intermediate thin film layer is interposed, first, an aqueous solution or colloid particle dispersion solution of atoms as a component constituting the intermediate thin film layer is prepared, the metal oxide colloid particles (A) are put thereinto, and the intermediate thin film layer is formed on the surface of the metal oxide colloid particles (A). When the intermediate thin film layer is formed, heating is preferably performed, and the temperature is preferably 40° C. or higher, or 200° C. or lower.

Next, an aqueous sol of the inorganic oxide colloid particles (B) may be added to an aqueous sol of the metal oxide colloid particles (A) on which the intermediate thin film layer has been formed to form a coating layer by the above method. As described above, the amount of the inorganic oxide colloid particles (B) added is in a range of 0.01 to 1.0 (mass ratio) with respect to the metal oxide colloid particles (A).

<Aqueous Sol of Modified Metal Oxide Colloid Particles (C)>

An aqueous sol of the modified metal oxide colloid particles (C) obtained by coating the metal oxide colloid particles (A) with the inorganic oxide colloid particles (B) obtained by the above method may be subjected to a washing treatment as necessary to remove impurities. In addition, a total metal oxide concentration in the aqueous sol can be adjusted by a method such as ultrafiltration and evaporative concentration, and the pH and temperature of the aqueous sol can be appropriately adjusted. In addition, as necessary, heating may be performed at, for example, 40° C. to 200° C. Here, in this specification, the "total metal oxide concentration" in the colloid particles (C) is defined as a concentration of oxides such as $TiO_2$, $SnO_2$, $ZrO_2$, and the like contained in the colloid particles (A) and the colloid particles (B), and a concentration of oxides also including $SiO_2$ when the colloid particles (B) contain $SiO_2$.

When it is desired to further increase the concentration of the aqueous sol, concentration can be performed by a general method, for example, an evaporation method or an ultrafiltration method, to a maximum of about 50% by mass. In addition, when it is desired to adjust the pH of the sol, adjustment can be performed by adding an alkali metal, organic base (amine), oxycarboxylic acid, or the like (to be described below) to the sol after concentration.

In particular, a sol in which the total concentration of metal oxides (total metal oxide concentration) is 10 to 40% by mass is practically preferable.

In the aqueous sol of the modified metal oxide colloid particles (C), water as a dispersion medium for the aqueous sol is substituted with a hydrophilic organic solvent, and thus an organic solvent dispersion sol (organosol) is obtained. This replacement can be performed by a conventional method such as a distillation method and an ultrafiltration method. Examples of hydrophilic organic solvents include lower alcohols such as methyl alcohol, ethyl alcohol, and isopropyl alcohol, ethers such as propylene glycol monomethyl ether, and propylene glycol monoethyl ether, linear amides such as dimethylformamide, and N,N'-dimethylacetamide, cyclic amides such as N-methyl-2-pyrrolidone, and glycols such as ethyl cellosolve and ethylene glycol.

The sol of the modified metal oxide colloid particles (C) can contain other optional components as long as the object of the present invention is achieved. In particular, when a proportion of oxycarboxylic acids contained is about 30% by mass or less with respect to a total amount of all metal oxides, colloids having further improved performance such as dispersibility can be obtained. Examples of oxycarboxylic acids used include lactic acid, tartaric acid, citric acid, gluconic acid, malic acid, and glycolic acid.

In addition, the sol of the modified metal oxide colloid particles (C) can contain an alkali component, and examples thereof include hydroxides of the alkali metals, such as Li, Na, K, Rb, Cs, and the like; organic bases such as alkylamines such as ammonia, ethylamine, triethylamine, isopropylamine, and n-propylamine, aralkylamines such as benzylamine, alicyclic amines such as piperidine, and alkanolamines such as monoethanolamine and triethanolamine. These can be contained as a mixture of two or more thereof. A proportion of these contained can be about 30% by mass or less with respect to a total amount of all metal oxides. In addition, they can be used in combination with the above oxycarboxylic acid.

<Modified Metal Oxide Colloid Particles (C) Obtained by Bonding Organosilicon Compound of Component (S1) to at least Part of Surface>

The modified metal oxide colloid particles (C) used in the present invention may be those in which an organosilicon compound of the component (S1) is bonded to at least a part of the surface. In this case, more specifically, the particles have a structure in which a hydrolyzable group of the organosilicon compound (S1) is bonded to a hydroxy group derived from the inorganic oxide colloid particles (B) serving as a coating in the modified metal oxide colloid particles (C).

In order for the organosilicon compound of the component (S1) to be bonded to the surface of the modified metal oxide colloid particles (C), for example, a predetermined amount of the colloid particles (C) (for example, a sol of the colloid particles (C)) is mixed into an alcohol solution of the organosilicon compound of the component (S1), (if necessary) a predetermined amount of water, and as necessary, a hydrolysis catalyst such as dilute hydrochloric acid are added thereto, and the mixture is then left for a predetermined time at room temperature or may be heated.

The organosilicon compounds (S1) bonded to the surface of the modified metal oxide colloid particles (C) may be used alone or two or more thereof may be used in combination.

In addition, when a surface modification treatment in which the organosilicon compound (S1) is bonded to the surface of the modified metal oxide colloid particles (C) is performed, the organosilicon compound (S1) may be partially hydrolyzed in advance or the surface modification treatment may be performed without performing hydrolysis.

In addition, after the surface modification treatment, a state in which hydrolyzable groups of the organosilicon compound (S1) have reacted with hydroxy groups on the surface of the modified metal oxide colloid particles (C) is preferable, but there is no problem even if some hydroxy groups are left untreated.

In addition, the amount of the organosilicon compound of the component (S1) bonded to the surface of the metal oxide colloid particles (C) is not particularly limited, but is, for example, 0.1 to 40% by mass, for example, 3 to 30% by mass, and preferably 5 to 20% by mass with respect to a total mass of all metal oxides of the metal oxide colloid particles (C).

Here, the organosilicon compound of the component (S1) to be bonded to at least a part of the surface of the modified metal oxide colloid particles (C) can be appropriately selected from among the compounds exemplified above, and is not particularly limited.

Preferably, an organosilicon compound having a ureido group may be exemplified and examples thereof include ureido methyltrimethoxysilane, 2-ureido ethyltrimethoxysilane, 3-ureido propyltrimethoxysilane, ureido methyltriethoxysilane, 2-ureidoethyltriethoxysilane, and 3-ureidopropyltriethoxysilane. When the organosilicon compound having a ureido group is bonded to the surface of the modified metal oxide colloid particles (C), it is possible to improve adhesion to the substrate (base material).

[Coating Composition]

The coating composition of the present invention comprises the component (S): organosilicon compounds and/or a silicon-containing substance which is a hydrolyzate thereof, and the component (T): modified metal oxide colloid particles having an average particle diameter of 2 to 100 nm.

The ratio of the component (S) to the component (T) is not particularly limited. For example, a proportion of the component (S) contained can be 25 to 300 parts by mass with respect to 100 parts by mass of the modified metal oxide colloid particles of the component (T).

<Other Components>

The coating composition of the present invention can contain a curing catalyst (curing agent) for promoting a curing reaction. Examples of curing catalysts (curing agents) include at least one curing catalyst selected from the group consisting of amines, amino acids, metal alkoxide, metal chelate compounds, organic acid metal salts, perchloric acids or salts thereof, acids or salts thereof, and metal chloride.

The curing catalyst (curing agent) is used for promoting curing of the organosilicon compound (S) contained in the coating composition, particularly, a silanol group (or an epoxy group in some cases) of the component (S1) and the component (S2). When such a curing catalyst (curing agent) is used, it is possible to accelerate a coating forming reaction.

Specific examples thereof include amines such as ethylamine, n-butylamine, triethylamine, allylamine, guanidine, and biguanizide; amino acids such as glycine; alkoxides of metals such as aluminum, zirconium and titanium; metal chelate compounds such as aluminum acetylacetonate, chromium acetylacetonate, titanium acetylacetonate, and cobalt acetylacetonate; organic acid metal salts such as sodium acetate, zinc naphthenate, cobalt naphthenate, zinc octylate, and tin octylate; perchloric acids such as perchloric acid, ammonium perchlorate, and magnesium perchlorate or salts thereof; inorganic acids or organic acids such as hydrochloric acid, phosphoric acid, nitric acid, chromic acid, hypochlorous acid, boric acid, bromic acid, selenous acid, thiosulfuric acid, orthosilicic acid, thiocyanic acid, nitrous acid, aluminic acid, carbonic acid, organic carboxylic acid, and p-toluenesulfonic acid, or salts thereof; and metal chlorides that are Lewis acids such as $SnCl_2$, $AlCl_3$, $FeCl_3$, $TiCl_4$, $ZnCl_2$, and $SbCl_3$.

Such a curing catalyst (curing agent) of which the type and the amount used can be appropriately adjusted according to, for example, the composition of the coating composition of the present invention, and can be used. When the curing catalyst (curing agent) is used, the upper limit of the amount used is desirably 5% by mass or less with respect to the total solid content in the coating composition. Here, in this specification, "total solid content" refers to all components of the coating composition excluding the solvent, and is treated as "solid content" for convenience also in the case of liquid components.

In addition, in the coating composition of the present invention, in order to impart fluidity, adjust a solid content concentration, and adjust surface tension, viscosity, an evaporation rate, and the like, a solvent may be used. The solvent used is water or an organic solvent.

Examples of organic solvents used include alcohols such as methanol, ethanol, isopropyl alcohol, and butanol, cellosolves such as methyl cellosolve and ethyl cellosolve, glycols such as ethylene glycol, esters such as methyl acetate, ethyl acetate, and butyl acetate, ethers such as diethyl ether, propylene glycol monomethyl ether, propylene glycol monoethyl ether, and tetrahydrofuran, ketones such as acetone and methyl ethyl ketone, halogenated hydrocarbons such as dichloroethane, aromatic hydrocarbons such as toluene and xylene, and N,N-dimethylformamide, N-methyl-2-pyrrolidone, and the like.

Here, the concentration of the total solid content in the coating composition of the present invention can be, for example, 20 to 80% by mass, 20 to 40% by mass, or 30 to 70% by mass.

In addition, in the coating composition of the present invention, as will be described below, when a cured film from the composition is formed on the substrate, various surfactants can be contained in order to improve wettability with respect to the substrate and improve smoothness of the cured film. In addition, a UV absorber, an antioxidant, an antistatic agent, and the like can be added as long as they do not influence physical properties of the cured film. In addition, a disperse dye, an oil-soluble dye, a fluorescent dye, a pigment, a photochromic compound, a thixotropic agent, and the like may be added.

In addition, various fine particulate metal oxides can be contained in the coating composition of the present invention in order to match the refractive index with the substrate (base material, for example, a lens). Examples of fine particulate metal oxides include fine particles of aluminum oxide, titanium oxide, antimony pentoxide, zirconium oxide, silicon dioxide, and cerium oxide which have an average primary particle diameter of 2 to 60 nm.

[Cured Film and Optical Member]

The coating composition of the present invention can be applied to the surface of the substrate to form a cured film. Here, in addition, when a transparent substrate (optical substrate) suitable for an optical application is used, it is possible to obtain an optical member having a cured film. The optical member is also an object of the present invention.

Regarding the substrate to be used, various substrates made of a glass, a plastic, and the like are used, and specific examples thereof include various optical lenses such as spectacle lenses and cameras, various display element filters, looking glasses, window glasses, coating films for vehicles and the like, and light covers used for vehicles and the like. On the surface of the substrate, a cured film (transparent film) is formed from the coating composition of the present invention as a hard coat film. Here, in addition to applications as a hard coat film, it may be formed as a film for a primer of a plastic lens, or the like.

The coating composition can be cured by hot air drying or active energy ray emission. Regarding curing conditions of hot air drying, curing may be performed in hot air at 70 to 200° C. and particularly preferably at 90 to 150° C. In addition, examples of active energy rays include infrared rays, ultraviolet rays, and electron beams, and particularly, far infrared rays can reduce damage due to heat.

Regarding a method of applying the coating composition of the present invention to the surface of the substrate, generally used methods such as a dipping method, a spin method, and a spray method can be applied. Among these, a dipping method and a spin method are particularly preferable in consideration of surface accuracy.

In addition, before the coating composition is applied to the surface of the substrate, the surface of the substrate is subjected to a chemical treatment with an acid, an alkali or various organic solvents, or a detergent, or a physical treatment with plasma, ultraviolet rays or the like, and thus adhesion between the substrate and the cured film can be improved. In addition, when the surface of the substrate is subjected to a primer treatment using various resins, adhesion between the substrate and the cured film can be further improved.

In addition, a cured film formed from the coating composition of the present invention can be used for a reflective film as a high-refractive-index film, and can be used as a multifunctional film by additionally adding functional components such as antifogging, photochromic, and antifouling.

An optical member having a cured film formed from the coating composition of the present invention can be used for camera lenses, vehicle window glasses, and optical filters attached to liquid crystal displays or plasma displays, for example, in addition to spectacle lenses.

In addition, the optical member of the present invention has a cured film formed from the coating composition of the present invention on the surface of the optical substrate, and an anti-reflective coating formed from a deposition film of an inorganic oxide can be formed on the cured film. The anti-reflective coating is not particularly limited, and a single layer or multi-layer deposition film of an inorganic oxide, which is conventionally known, can be used. Examples of anti-reflective coatings include anti-reflective coatings disclosed in Japanese Unexamined Patent Application Publication No. H2-262104 (JP 2-262104 A) and Japanese Unexamined Patent Application Publication No. S56-116003 (JP 56-116003 A).

EXAMPLES

While the present invention will be described below in more detail with reference to reference examples, production examples, examples and comparative examples, the present invention is not limited to these examples.

Various physical properties of the dispersion solution were determined by the following measurement methods.

[Specific gravity] It was determined by a hydrometer method.

[Viscosity] It was determined by an Ostwald viscometer (20° C.).

[Water content] It was determined by a Karl Fischer titration method.

[Average particle diameter obtained through dynamic light scattering (dynamic light scattering method particle diameter)] A sol was diluted with a dispersion solvent, and measurement was performed using parameters of the solvent by a dynamic light scattering method measurement device (Zetasizer commercially available from Malvern Instruments Ltd.).

[Average primary particle diameter determined using a transmission electron microscope]

A sol was dropped onto a copper mesh and dried and observation was performed using a transmission electron microscope (JEM-1020 commercially available from JEOL Ltd.) at an acceleration voltage of 100 kV, and a value obtained by averaging 100 measured particles was determined as an average primary particle diameter.

In addition, various physical properties of optical members having cured films obtained in examples and comparative examples were measured and evaluated by the following measurement methods.

(1) Hardness Test

Measurement was performed on the cured film formed on a glass substrate using a dynamic ultra-micro hardness tester DUH-211 (commercially available from Shimadzu Corporation). Determination criteria were as follows.

A: The hardness was improved by 10% or more compared to a comparative example

B: The hardness was within ±10% compared to a comparative example

C: The hardness was reduced by 10% or more compared to a comparative example (2) Abrasion Resistance Test The surface of the cured film formed on a urethane plastic lens substrate was rubbed with Steel Wool #0000 and scratch resistance was visually determined. Here, conditions for the abrasion resistance test were 1 time/10 seconds under a load of 1 kg or more. Determination criteria were as follows.

A: No scratches could be confirmed

B: Some scratches could be confirmed

C: Noticeable scratches could be confirmed (3) Adhesion Test

The cured film formed on the glass substrate was cross-cut with 100 squares at intervals of 1 mm, and an adhesive tape (cellophane tape, product commercially available from Nichiban Co., Ltd.) was strongly attached to the cross-cut parts, and the adhesive tape was then rapidly peeled off, and it was checked whether the cured film was peeled off thereafter. Evaluation criteria were as follows.
- A: There was no peeling off or peeling off was confirmed in less than 5 squares out of 100 squares.
- B: Peeling off was confirmed in 5 to 30 squares out of 100 squares
- C: Peeling off was confirmed in 31 to 60 squares out of 100 squares
- D: Peeling off was confirmed in 61 to 90 squares out of 100 squares
- E: Peeling off was confirmed in 91 squares or more out of 100 squares (4) Adhesion Test after Weather Resistance Test The cured film formed on the urethane plastic lens substrate was exposed for 100 hours using a xenon weather meter (emission intensity 40 mW/m$^2$). The cured film after exposure was cross-cut, the same test as in (3) adhesion test was performed, and it was checked whether the cured film was peeled off after the adhesive tape was peeled off. Evaluation criteria were the same as in (3) adhesion test.

(5) Transparency Test

Under a fluorescent lamp in a dark room, it was visually checked whether there was fogging on the cured film formed on the urethane plastic substrate. Determination criteria were as follows.
- A: Almost no fogging occurred
- B: Fogging occurred, but there was no problem for a transparent cured film
- C: Whitening was noticeably expressed (6) Weather Resistance Test The obtained optical member (having a cured film formed on the urethane plastic substrate) was exposed outdoors for one month and change in the appearance of the optical member after exposure was visually determined.

Reference Example 1

Inorganic Oxide Colloid Particles (B) Serving as a Coating: Preparation of an Aqueous Sol of Stannic Oxide-Silicon Dioxide Composite Colloid Particles (B0)

55.7 g of a sodium silicate aqueous solution (containing 15.0% by mass of SiO$_2$, commercially available from Nissan Chemical Corporation) was diluted with 354.8 g of pure water and 7.5 g of a sodium stannate powder (containing 55.7% by mass of SnO$_2$, commercially available from Showa Kako Corporation) was then mixed together with stirring, and stirring was continued for 1 hour to obtain a mixed solution containing sodium silicate and sodium stannate. 730 g of the obtained mixed aqueous solution containing sodium silicate and sodium stannate was passed through a column filled with a hydrogen type cation exchange resin (amberlite IR-120B, commercially available from Organo Corporation). After cation exchange, 2.5 g of diisopropylamine was added to the obtained stannic-silicic acid aqueous solution with stirring to obtain 733 g of an aqueous sol of stannic oxide-silicon dioxide composite colloid particles.

In the obtained stannic oxide-silicon dioxide composite colloid particles (B0), the concentration of all metal oxides (SnO$_2$+SiO$_2$) was 2.0%, the mass ratio of SiO$_2$/SnO$_2$ was 2/1, and the average primary particle diameter observed with a transmission electron microscope was 1 to 4 nm.

Reference Example 2

Metal Oxide Colloid Particles (A) Serving as Nuclei: Preparation of an Aqueous Sol of Titanium Oxide-Zirconium Oxide-Tin Oxide Composite Colloid Particles (A0)

An aqueous sol of titanium oxide-zirconium oxide-tin oxide composite colloid particles (A0) was prepared through the following processes (a) to (c).

Process (a): 150.0 g of titanium oxychloride (containing 28.0% by mass of TiO$_2$, commercially available from Sumitomo Titanium Corporation), 12 g of zirconium carbonate (containing 40.8% by mass of ZrO$_2$, commercially available from Daiichi Kigenso Kagaku Kogyo Co., Ltd.) and 357 g of pure water were put into a 3 L glass container and 531 g of a mixed aqueous solution containing titanium oxychloride and zirconium oxychloride (7.91% by mass of TiO$_2$ and 0.92% by mass of ZrO$_2$) was prepared. The mixed aqueous solution was heated to 60° C. with stirring. Then, 5.25 g of 35% by mass hydrogen peroxide water (for industrial use) and 3.15 g of metal tin powder (AT-Sn, No. 200 commercially available from Yamaishi Metal Co., Ltd.) were added thereto 10 times in evenly divided manner while the liquid temperature was maintained at 60 to 70° C. Hydrogen peroxide water and metal tin powder were added by a method in which first hydrogen peroxide water and then metal tin powder were gradually added and addition of hydrogen peroxide water and metal tin was continuously repeated after a metal tin dissolution reaction was completed (5 to 10 minutes). Since the reaction was an exothermic reaction, the reaction was performed while the container was cooled and the liquid temperature was maintained at 60 to 70° C. During addition, the ratio of hydrogen peroxide water and metal tin was the molar ratio of H$_2$O$_2$/Sn of 2.0. A time required for adding hydrogen peroxide water and metal tin powder was 1 hour. After the reaction was completed, 12 g of zirconium carbonate (containing 40.8% by mass of ZrO$_2$, commercially available from Daiichi Kigenso Kagaku Kogyo Co., Ltd.) was additionally dissolved in the obtained aqueous solution, and aging was performed at 85° C. for 2 hours, and 557.4 g of a light yellow transparent basic titanium chloride-zirconium-tin complex salt aqueous solution was obtained. In the obtained basic titanium chloride-zirconium-tin complex salt aqueous solution, the titanium oxide concentration was 7.5% by mass, the zirconium oxide concentration was 1.8% by mass, the tin oxide concentration was 0.7% by mass, the molar ratio of SnO$_2$/TiO$_2$ was 0.05, and the molar ratio of ZrO$_2$/TiO$_2$ was 0.15.

Process (b): 2,227 g of pure water was added to 557.4 g of the basic titanium chloride-zirconium-tin complex salt aqueous solution obtained in the process (a) and a 2.0% by mass aqueous solution of TiO$_2$, ZrO$_2$ and SnO$_2$ in total was obtained. The aqueous solution was hydrolyzed at 95 to 98° C. for 10 hours, and an aggregate slurry of titanium oxide-zirconium oxide-tin oxide composite colloid particles was obtained.

Process (c): the aggregate slurry of the titanium oxide-zirconium oxide-tin oxide composite colloid particles obtained in the process (b) was washed with pure water using an ultrafiltration device, an excess electrolyte was removed and peptized, and 1,102 g of an aqueous sol of acidic titanium oxide-zirconium oxide-tin oxide composite colloid particles (A0) was obtained. In the obtained aqueous sol, the pH was 2.9, the conductivity was 1,740 μS/cm, the concentration of all metal oxides (total amount of $TiO_2$, $ZrO_2$ and $SnO_2$) was 5.04% by mass, and the average primary particle diameter of the titanium oxide-zirconium oxide-tin oxide composite colloid particles was 6 to 10 nm.

Reference Example 3

Modified Metal Oxide Colloid Particles (C): Preparation of a Methanol Sol of Stannic Oxide-Silicon Dioxide Coating-Titanium Oxide-Zirconium Oxide-Tin Oxide Composite Colloid Particles (C1)

1,323 g of pure water and 2.4 g of diisopropylamine were added to 503 g of the aqueous sol of stannic oxide-silicon dioxide composite oxide colloid particles (B0) obtained in Reference Example 1, and 1,190 g of the aqueous sol of acidic titanium oxide-zirconium oxide-tin oxide composite colloid particles (A0) obtained according to the process (c) in Reference Example 2 was then added thereto with stirring, and stirring was then performed for 0.5 hours, and an aqueous sol of stannic oxide-silicon dioxide coating-titanium oxide-zirconium oxide-tin oxide composite colloid particles with a concentration of 2.5% by mass was obtained.

3,018 g of the obtained aqueous sol of stannic oxide-silicon dioxide coating-titanium oxide-zirconium oxide-tin oxide composite colloid particles was passed through a column filled with a hydroxyl group type anion exchange resin (amberlite IRA-410, commercially available from Organo Corporation), and 3,620 g of an aqueous sol of stannic oxide-silicon dioxide coating-titanium oxide-zirconium oxide-tin oxide composite colloid particles was obtained. In the obtained aqueous sol, the pH was 10.2, and the total metal oxide concentration was 2.1% by mass. 3,620 g of the aqueous sol of stannic oxide-silicon dioxide coating-titanium oxide-zirconium oxide-tin oxide composite colloid particles obtained above was put into an SUS container and subjected to a hydrothermal treatment at 150° C. and a pressure of 0.3 MPa for 5 hours with stirring, and 3,620 g of an aqueous sol was obtained. The obtained sol was concentrated using an ultrafiltration device. In the obtained sol, the specific gravity was 1.193, the viscosity was 3.7 mPa·s, the pH was 7.8, the average primary particle diameter in transmission electron microscope observation was 5 to 6 nm, the average particle diameter measured by a dynamic light scattering method (dynamic light scattering method particle diameter) was 64 nm, and the total metal oxide concentration was 21.5% by mass. Water was distilled off from 349 g of the concentrated aqueous sol using an evaporator having an eggplant flask at 600 torr while adding methanol, and thus water in the aqueous sol was substituted with methanol, and a methanol sol of titanium oxide-zirconium oxide-tin oxide composite colloid particles (C1) modified (coated) with stannic oxide-silicon dioxide composite colloid particles was obtained. In the obtained sol, the specific gravity was 1.058, the viscosity was 2.5 mPa·s, the pH was 6.9 (diluted with the same mass of water), the average primary particle diameter in transmission electron microscope observation was 8 to 12 nm, the average particle diameter measured by a dynamic light scattering method (dynamic light scattering method particle diameter) was 51 nm, the water content was 1.0%, the transmittance was 45%, and the total metal oxide concentration was 30.5% by mass.

Production Example 1

Preparation of Modified Metal Oxide Colloid Particles (C) Obtained by Bonding an Organosilicon Compound of the Component (S1) to the Surface 1,000 g of the methanol sol of titanium oxide-zirconium oxide-stannic oxide composite colloid particles (C1) modified (coated) with the stannic oxide-silicon dioxide composite colloid particles obtained in Reference Example 3 was concentrated under a reduced pressure to obtain 965 g of a concentrated sol. 52.5 g of a ureidopropyltriethoxysilane methanol solution (concentration of 50% by mass, KBE585 commercially available from Shin-Etsu Chemical Co., Ltd.) was added thereto with stirring, a reaction was caused under reflux for 5 hours, and 1,017.5 g of a methanol sol of colloid particles (C2) which contained titanium oxide-zirconium oxide-stannic oxide composite colloid particles as nuclei and in which ureidopropyltriethoxysilane was bonded to the surface of titanium oxide-zirconium oxide-stannic oxide composite colloid particles generally coated with stannic oxide-silicon dioxide composite colloids was obtained through a vacuum concentration process using an evaporator. In the obtained sol, the specific gravity was 1.070, the viscosity was 1.6 mPa·s, the total metal oxide concentration was 30.5% by mass, the water content was 0.7% by mass, and the average particle diameter measured by a dynamic light scattering method (dynamic light scattering method particle diameter) was 17 nm.

Example 1

Production of Coating Composition 58.7 parts by mass of γ-glycidoxypropyltrimethoxysilane and 2.8 parts by mass of a benzotriazole silane coupling agent (X-12-1214A commercially available from Shin-Etsu Chemical Co., Ltd.) were put into a glass container having a magnetic stirrer, and 19.3 parts by mass of 0.01 N hydrochloric acid was added dropwise thereto for 3 hours with stirring. After dropwise addition was completed, the mixture was stirred for 0.5 hours, and a partial hydrolyzate of γ-glycidoxypropyltrimethoxysilane and the benzotriazole silane coupling agent was obtained.

Next, 69.6 parts by mass of propylene glycol monomethyl ether, 59.1 parts by mass of methanol, 88.3 parts by mass of a methanol sol (containing 30.5% by mass in terms of all metal oxides) of titanium oxide-zirconium oxide-stannic oxide composite colloid particles (C2) modified (coated) with stannic oxide-silicon dioxide composite colloids to which ureidopropyltriethoxysilane was bonded obtained in Production Example 1, and additionally, 2.3 parts by mass of aluminum acetylacetonate as a curing agent were added to 80.8 parts by mass of the above partial hydrolyzate of γ-glycidoxypropyltrimethoxysilane and the benzotriazole silane coupling agent and the mixture was sufficiently stirred to produce a coating solution for hard coat (coating composition).

(Formation and Evaluation of Cured Film)

A urethane plastic lens (refractive index $n_D$=1.60) substrate and a glass substrate were prepared, and a coating solution for hard coat (coating composition) was applied thereto by a dip coating method (film thickness of 3 μm), a solvent was evaporated at 80° C. for 10 minutes, a heat treatment was then performed at 120° C. for 2 hours, a coating film was cured, and an optical member having a cured film was formed.

The tests shown in the above (1) to (6) were performed. The evaluation results are shown in Table 1. Here, the hardness was evaluated in comparison with data of Comparative Example 3.

Example 2

A coating composition was produced and a cured film was formed and evaluated in the same manner as in Example 1 except that the amount of γ-glycidoxypropyltrimethoxysilane added was changed to 55.6 parts by mass, and the amount of the benzotriazole silane coupling agent added was changed to 5.5 parts by mass.

Example 3

A coating composition was produced and a cured film was formed and evaluated in the same manner as in Example 1 except that the amount of γ-glycidoxypropyltrimethoxysilane added was changed to 49.4 parts by mass, and the amount of the benzotriazole silane coupling agent added was changed to 11.1 parts by mass.

Example 4

A coating composition was produced and a cured film was formed and evaluated in the same manner as in Example 1 except that the amount of γ-glycidoxypropyltrimethoxysilane added was changed to 43.2 parts by mass, and the amount of the benzotriazole silane coupling agent added was changed to 16.6 parts by mass.

Example 5

A coating composition was produced and a cured film was formed and evaluated in the same manner as in Example 3 except that a methanol sol of the titanium oxide-zirconium oxide-tin oxide composite colloid particles (C1) modified with stannic oxide-silicon dioxide composite colloid particles obtained in Reference Example 3 (sol of colloid particles with no ureidopropyltriethoxysilane bonded to the surface) (containing 30.5% by mass in terms of all metal oxides) was used in place of the colloid particles (C2) obtained in Production Example 1.

Here, the hardness was evaluated in comparison with data of Comparative Example 3.

Example 6

(Production of Coating Composition)

27.7 parts by mass of γ-glycidoxypropyltrimethoxysilane and 6.0 parts by mass of a benzimidazole silane coupling agent (X-12-1078 commercially available from Shin-Etsu Chemical Co., Ltd.) were put into a glass container having a magnetic stirrer, and 7.9 parts by mass of 0.01 N hydrochloric acid was added dropwise thereto for 3 hours with stirring. After dropwise addition was completed, stirring was performed for 0.5 hours, and a partial hydrolyzate of γ-glycidoxypropyltrimethoxysilane and the benzimidazole silane coupling agent was obtained.

Next, 21.9 parts by mass of propylene glycol monomethyl ether, 11.3 parts by mass of methanol, 88.3 parts by mass of a methanol sol (containing 30.5% by mass in terms of all metal oxides) of titanium oxide-zirconium oxide-stannic oxide composite colloid particles (C2) modified (coated) with stannic oxide-silicon dioxide composite colloids to which ureidopropyltriethoxysilane was bonded obtained in Production Example 1, and additionally, 2.0 parts by mass of aluminum acetylacetonate as a curing agent were added to 41.6 parts by mass of the above partial hydrolyzate of γ-glycidoxypropyltrimethoxysilane and the benzotriazole silane coupling agent, and the mixture was sufficiently stirred to produce a coating solution for hard coat (coating composition).

(Formation and Evaluation of Cured Film)

A urethane plastic lens (refractive index $n_D$=1.67) substrate and a glass substrate were prepared, and a coating solution for hard coat (coating composition) was applied thereto by a dip coating method (film thickness of 3 μm), a solvent was evaporated at 80° C. for 10 minutes, a heat treatment was then performed at 120° C. for 2 hours, a coating film was cured, and an optical member having a cured film was formed.

The tests shown in the above (1) to (6) were performed. The evaluation results are shown in Table 1. Here, the hardness was evaluated in comparison with data of Comparative Example 3.

Example 7

A coating composition was produced and a cured film was formed and evaluated in the same manner as in Example 6 except that the amount of γ-glycidoxypropyltrimethoxysilane added was changed to 24.2 parts by mass, and the amount of the benzimidazole silane coupling agent added was changed to 9.0 parts by mass.

Example 8

A coating composition was produced and a cured film was formed and evaluated in the same manner as in Example 6 except that no benzimidazole silane coupling agent was added, and instead, 6.2 parts by mass of a benzotriazole silane coupling agent (X-12-1214A, commercially available from Shin-Etsu Chemical Co., Ltd.) was added.

Comparative Example 1

A coating composition was produced and a cured film was formed and evaluated in the same manner as in Example 1 except that the amount of γ-glycidoxypropyltrimethoxysilane added was changed to 61.7 parts by mass, and no benzotriazole silane coupling agent was added. Here, the hardness was evaluated in comparison with data of Comparative Example 3.

Comparative Example 2

A coating composition was produced in the same manner as in Example 3 except that no benzotriazole silane coupling agent was added, and instead, 16.8 parts by mass of aminopropyltriethoxysilane was added. Since gelation was observed in the coating solution for hard coat (coating composition) after stirring, no coating film was produced.

Comparative Example 3

A coating composition was produced and a cured film was formed and evaluated in the same manner as in Example 5 except that the amount of γ-glycidoxypropyltrimethoxysilane added was changed to 61.7 parts by mass, and no benzotriazole silane coupling agent was added.

Comparative Example 4

A coating composition was produced and a cured film was formed and evaluated in the same manner as in Example 6 except that the amount of γ-glycidoxypropyltrimethoxysilane added was changed to 34.6 parts by mass, and no benzimidazole silane coupling agent was added. Here, the hardness was evaluated in comparison with data of Comparative Example 3.

TABLE 1

|  | Hardness | Abrasion resistance | Adhesion | Adhesion after weather resistance test | Transparency | Appearance after weather resistance test |
|---|---|---|---|---|---|---|
| Example 1 | A | A | A | A | A | No change |
| Example 2 | A | A | A | A | A | No change |
| Example 3 | A | A | A | A | A | No change |
| Example 4 | A | A | A | A | A | No change |
| Example 5 | A | A | A | A | A | No change |
| Example 6 | A | A | A | A | A | No change |
| Example 7 | A | A | A | A | A | No change |
| Example 8 | A | A | A | A | A | No change |
| Comparative Example 1 | B | A | C | E | A | No change |
| Comparative Example 2 | — | — | — | — | — | — |
| Comparative Example 3 | — | A | D | E | A | No change |
| Comparative Example 4 | A | A | A | E | A | No change |

※Hardness (Examples 1 to 8, Comparative Example 1 and Comparative Example 4) shows an evaluation compared with Comparative Example 3

Production Example 2

Preparation of Modified Metal Oxide Colloid Particles (C)

<Preparation of Metal Oxide Colloid Particles (A) Serving as Nuclei>

568.3 g of pure water was put into a 2 L container, and 191.7 g of a 25% by mass tetramethyl ammonium hydroxide aqueous solution, 8.9 g of metastannic acid (containing 7.5 g in terms of $SnO_2$), 142 g of titanium tetraisopropoxide (containing 40 g in terms of $TiO_2$), and 49.2 g of oxalic acid dihydrate (35.1 g in terms of oxalic acid) were added thereto with stirring. In the obtained mixed solution, the molar ratio of oxalic acid/titanium atom was 0.78, and the molar ratio of tetramethyl ammonium hydroxide/titanium atom was 1.05. 950 g of the mixed solution was left at 80° C. for 2 hours, and additionally decompressed to 580 Torr and left for 2 hours to prepare a titanium mixed solution. The pH of the prepared titanium mixed solution was 5.1, the conductivity was 30.9 mS/cm, and the total metal oxide concentration (total amount of $TiO_2$ and $SnO_2$) was 5.0% by mass. 950 g of the titanium mixed solution was put into a 3 L glass-lined autoclave container, and subjected to a hydrothermal treatment at 140° C. for 5 hours. After cooling was performed to room temperature, the solution taken out after the hydrothermal treatment was a water dispersion sol of light milky white titanium oxide-tin oxide colloid particles. In the obtained sol, the pH was 3.9, the conductivity was 32.6 mS/cm, the total metal oxide concentration (total amount of $TiO_2$ and $SnO_2$) was 5.0% by mass, tetramethyl ammonium hydroxide was 5.0% by mass, oxalic acid was 3.7% by mass, the average particle diameter measured by a dynamic light scattering method (dynamic light scattering method particle diameter) was 16 nm, and in transmission electron microscope observation, elliptical particles having an average primary particle diameter of 5 to 10 nm were observed. A powder obtained by drying the obtained sol at 110° C. was subjected to X-ray diffraction analysis, and it was confirmed that the powder was a rutile crystal. The obtained titanium oxide-tin oxide colloid particles were used as titanium oxide-tin oxide composite oxide colloid particles (A1).

Next, 70.8 g of zirconium oxychloride (containing 21.19% by mass of $ZrO_2$, commercially available from Daiichi Kigenso Kagaku Kogyo Co., Ltd.) was diluted with 429.2 g of pure water to prepare 500 g of a zirconium oxychloride aqueous solution (containing 3.0% by mass of $ZrO_2$), and 1,298.7 g of a water dispersion sol of the titanium oxide-tin oxide composite colloid (A1) obtained above was added thereto with stirring. Next, hydrolysis was performed by performing heating to 95° C., and a water dispersion sol of titanium oxide-tin oxide-zirconium oxide composite oxide colloid particles (A2) having a zirconium oxide thin film layer formed on the surfaces was obtained.

<Preparation of Inorganic Oxide Colloid Particles (B) Serving as Coating>

77.2 g of JIS No. 3 sodium silicate (containing 29.8% by mass of $SiO_2$, commercially available from Fuji Chemical Industries Co., Ltd.) was dissolved in 1,282 g of pure water, and 20.9 g of sodium stannate $NaSnO_3 \cdot H_2O$ (containing 55.1% by mass of $SnO_2$, commercially available from Showa Kako Corporation) was then dissolved. The obtained aqueous solution was passed through a column filled with a hydrogen type cation exchange resin (amberlite (registered trademark) IR-120B), and 2,634 g of a water dispersion sol of acidic silicon dioxide-stannic oxide composite colloid particles (pH 2.4, containing 0.44% by mass of $SnO_2$ and 0.87% by mass of $SiO_2$, the mass ratio of $SiO_2/SnO_2$ was 2.0, and the average primary particle diameter in transmission electron microscope observation was 1 to 4 nm) was obtained. Next, 6.9 g of diisopropylamine was added to the obtained water dispersion sol and a water dispersion sol of alkaline silicon dioxide-stannic oxide composite colloid particles (B1) was obtained.

<Preparation of Modified Metal Oxide Colloid Particles (C)>

A water dispersion sol of the titanium oxide-tin oxide-zirconium oxide composite oxide colloid particles (A2) was added to the water dispersion sol of alkaline silicon dioxide-stannic oxide composite colloid particles (B1) obtained above with stirring. Next, the sol was passed through a column filled with 500 ml of an anion exchange resin (amberlite (registered trademark) IRA-410, commercially available from Organo Corporation). Next, the water dispersion sol after passing through the column was heated at 95° C. for 3 hours, and then concentrated by an ultrafiltration membrane method, and a water dispersion sol of titanium oxide-tin oxide-zirconium oxide composite oxide colloid particles modified with a silicon dioxide-stannic oxide composite oxide was obtained. The total metal oxide concentration in the obtained water dispersion sol was 20% by mass and the average primary particle diameter of the sol in transmission electron microscope observation was 6 to 12 nm.

Next, a dispersion medium for the obtained water dispersion sol was substituted with methanol using a rotary evaporator to obtain a methanol dispersion sol of titanium oxide-tin oxide-zirconium oxide composite oxide colloid particles (C3) modified with a silicon dioxide-stannic oxide composite oxide (colloid particles (C:C3) having an intermediate thin film layer interposed between metal oxide colloid particles (A:A2) serving as nuclei and inorganic oxide colloid particles (B:B1) serving as a coating). In the methanol dispersion sol, the total metal oxide concentration was 30% by mass, the viscosity was 1.8 mPa·s, the average particle diameter measured by a dynamic light scattering method (DLS) (dynamic light scattering method particle diameter) was 20 nm, and the water content was 1.5% by mass.

Production Example 3: Preparation of modified metal oxide colloid particles (C) obtained by bonding an organosilicon compound of the component (S1) to the surface 1,000 g of a methanol dispersion sol of titanium oxide-tin oxide-zirconium oxide composite oxide colloid particles (C3) modified with the silicon dioxide-stannic oxide composite oxide obtained in Production Example 2 was concentrated under a reduced pressure to obtain 965 g of a concentrated sol. 52.5 g of a ureidopropyltriethoxysilane methanol solution (concentration 50% by mass, KBE585 commercially available from Shin-Etsu Chemical Co., Ltd.) was added thereto with stirring, a reaction was caused under reflux for 5 hours, and 1,017.5 g of a methanol dispersion sol of colloid particles (C4) obtained by bonding ureidopropyltriethoxysilane to the surface of titanium oxide-tin oxide-zirconium oxide composite oxide colloid particles modified with a silicon dioxide-stannic oxide composite oxide was obtained through a vacuum concentration process using an evaporator. In the obtained sol, the specific gravity was 1.070, the viscosity was 1.6 mPa·s, the total metal oxide concentration was 30.5% by mass, the water content was 0.7% by mass, and the average particle diameter measured by a dynamic light scattering method (dynamic light scattering method particle diameter) was 17 nm.

Example 9

(Production of Coating Composition)

58.7 parts by mass of γ-glycidoxypropyltrimethoxysilane and 2.8 parts by mass of a benzotriazole silane coupling agent (X-12-1214A commercially available from Shin-Etsu Chemical Co., Ltd.) were put into a glass container having a magnetic stirrer, and 19.3 parts by mass of 0.01 N hydrochloric acid was added dropwise thereto for 3 hours with stirring. After dropwise addition was completed, the mixture was stirred for 0.5 hours, and a partial hydrolyzate of γ-glycidoxypropyltrimethoxysilane and the benzotriazole silane coupling agent was obtained. Next, 69.6 parts by mass of propylene glycol monomethyl ether, 59.1 parts by mass of methanol, and 88.3 parts by mass of a methanol sol of titanium oxide-zirconium oxide-stannic oxide composite colloid particles (C4) modified with stannic oxide-silicon dioxide composite colloids to which ureidopropyltriethoxysilane was bonded, obtained in Production Example 3 (containing 30.5% by mass in terms of all metal oxides), and additionally, 2.3 parts by mass of aluminum acetylacetonate as a curing agent were added to 80.8 parts by mass of the above partial hydrolyzate of γ-glycidoxypropyltrimethoxysilane and the benzotriazole silane coupling agent, and the mixture was sufficiently stirred to produce a coating solution for hard coat (coating composition).

(Formation and Evaluation of Cured Film)

A urethane plastic lens (refractive index $n_D$=1.60) substrate and a glass substrate were prepared, and a coating solution for hard coat (coating composition) was applied thereto by a dip coating method (film thickness of 3 μm), a solvent was evaporated at 80° C. for 10 minutes, a heat treatment was then performed at 120° C. for 2 hours, a coating film was cured, and an optical member having a cured film was formed.

The tests shown in the above (1) to (6) were performed. The evaluation results are shown in Table 2. Here, the hardness was evaluated in comparison with data of Comparative Example 7.

Example 10

A coating composition was produced and a cured film was formed and evaluated in the same manner as in Example 9 except that the amount of γ-glycidoxypropyltrimethoxysilane added was changed to 55.6 parts by mass, and the amount of the benzotriazole silane coupling agent added was changed to 5.5 parts by mass.

Example 11

A coating composition was produced and a cured film was formed and evaluated in the same manner as in Example 9 except that the amount of γ-glycidoxypropyltrimethoxysilane added was changed to 49.4 parts by mass, and the amount of the benzotriazole silane coupling agent added was changed to 11.1 parts by mass.

Example 12

A coating composition was produced and a cured film was formed and evaluated in the same manner as in Example 9 except that the amount of γ-glycidoxypropyltrimethoxysilane added was changed to 43.2 parts by mass, and the amount of the benzotriazole silane coupling agent added was changed to 16.6 parts by mass.

Example 13

A coating composition was produced and a cured film was formed and evaluated in the same manner as in Example 11 except that a methanol dispersion sol (sol with no ureidopropyltriethoxysilane bonded to the surface) (containing 30.0% by mass in terms of all metal oxides) of the titanium oxide-tin oxide-zirconium oxide composite oxide colloid particles (C3) modified with a silicon dioxide-stannic oxide composite oxide obtained in Production Example 2 was used in place of the colloid particles obtained in Production Example 3. Here, the hardness was evaluated in comparison with data of Comparative Example 7.

Example 14

(Production of Coating Composition)

27.7 parts by mass of γ-glycidoxypropyltrimethoxysilane and 6.0 parts by mass of a benzimidazole silane coupling agent (X-12-1078 commercially available from Shin-Etsu Chemical Co., Ltd.) were put into a glass container having a magnetic stirrer, and 7.9 parts by mass of 0.01 N hydrochloric acid was added dropwise thereto for 3 hours with stirring. After dropwise addition was completed, stirring was performed for 0.5 hours, and a partial hydrolyzate of γ-glycidoxypropyltrimethoxysilane and the benzimidazole silane coupling agent was obtained. Next, 21.9 parts by mass of propylene glycol monomethyl ether, 11.3 parts by mass of methanol, and 88.3 parts by mass of a methanol sol of titanium oxide-zirconium oxide-stannic oxide composite colloid particles (C4) modified with stannic oxide-silicon dioxide composite colloids to which ureidopropyltriethoxysilane was bonded, obtained in Production Example 3 (containing 30.5% by mass in terms of all metal oxides), and additionally, 2.0 parts by mass of aluminum acetylacetonate as a curing agent were added to 41.6 parts by mass of the above partial hydrolyzate of γ-glycidoxypropyltrimethoxysilane and the benzotriazole silane coupling agent, and the mixture was sufficiently stirred to produce a coating solution for hard coat (coating composition).

(Formation and Evaluation of Cured Film)

A urethane plastic lens (refractive index $n_D$=1.67) substrate and a glass substrate were prepared, and a coating solution for hard coat (coating composition) was applied thereto by a dip coating method (film thickness of 3 μm), a solvent was evaporated at 80° C. for 10 minutes, a heat treatment was then performed at 120° C. for 2 hours, a coating film was cured, and an optical member having a cured film was formed.

The tests shown in the above (1) to (6) were performed. The evaluation results are shown in Table 2. Here, the hardness was evaluated in comparison with data of Comparative Example 7.

Example 15

A coating composition was produced and a cured film was formed and evaluated in the same manner as in Example 14 except that the amount of γ-glycidoxypropyltrimethoxysilane added was changed to 24.2 parts by mass, and the amount of the benzimidazole silane coupling agent added was changed to 9.0 parts by mass.

Example 16

A coating composition was produced and a cured film was formed and evaluated in the same manner as in Example 14 except that no benzimidazole silane coupling agent was added, and instead, 6.2 parts by mass of a benzotriazole silane coupling agent (X-12-1214A commercially available from Shin-Etsu Chemical Co., Ltd.) was added.

Comparative Example 5

A coating composition was produced and a cured film was formed and evaluated in the same manner as in Example 9 except that the amount of γ-glycidoxypropyltrimethoxysilane added was changed to 61.7 parts by mass, and no benzotriazole silane coupling agent was added. Here, the hardness was evaluated in comparison with data of Comparative Example 7.

Comparative Example 6

A coating composition was produced in the same manner as in Example 11 except that no benzotriazole silane coupling agent was added, and instead, 16.8 parts by mass of aminopropyltriethoxysilane was added. Since gelation was observed in the coating solution for hard coat (coating composition) after stirring, no coating film was produced.

Comparative Example 7

A coating composition was produced and a cured film was formed and evaluated in the same manner as in Example 13 except that the amount of γ-glycidoxypropyltrimethoxysilane added was changed to 61.7 parts by mass, and no benzotriazole silane coupling agent was added.

Comparative Example 8

A coating composition was produced and a cured film was formed and evaluated in the same manner as in Example 14 except that the amount of γ-glycidoxypropyltrimethoxysilane added was changed to 34.6 parts by mass, and no benzimidazole silane coupling agent was added. Here, the hardness was evaluated in comparison with data of Comparative Example 7.

TABLE 2

|  | Hardness | Abrasion resistance | Adhesion | Adhesion after weather resistance test | Transparency | Appearance after weather resistance test |
| --- | --- | --- | --- | --- | --- | --- |
| Example 9 | A | A | A | A | A | No change |
| Example 10 | A | A | A | A | A | No change |
| Example 11 | A | A | A | A | A | No change |
| Example 12 | A | A | A | A | A | No change |
| Example 13 | A | A | A | A | A | No change |
| Example 14 | A | A | A | A | A | No change |
| Example 15 | A | A | A | A | A | No change |
| Example 16 | A | A | A | A | A | No change |

TABLE 2-continued

| | Hardness | Abrasion resistance | Adhesion | Adhesion after weather resistance test | Transparency | Appearance after weather resistance test |
|---|---|---|---|---|---|---|
| Comparative Example 5 | B | A | C | E | A | No change |
| Comparative Example 6 | — | — | — | — | — | — |
| Comparative Example 7 | — | A | D | E | A | No change |
| Comparative Example 8 | A | A | A | E | A | No change |

※Hardness (Examples 9 to 16 and Comparative Example 5 and Comparative Example 8) shows an evaluation compared with Comparative Example 7.

In all of Examples 1 to 8, and 9 to 16, it was confirmed that, after the coating solution for hard coat was prepared, no gelation or phase separation occurred in the solution, and the coating composition had excellent stability.

In addition, as shown in Table 1 and Table 2, in all of Examples 1 to 8, and 9 to 16, in the optical member having a cured film which is a cured product of the coating solution for hard coat (coating composition), the hardness of the cured film, abrasion resistance, adhesion to the substrate, adhesion after the weather resistance test, transparency, and weather resistance were excellent.

On the other hand, Comparative Examples 1, 3, 5, and 7 had inferior hardness compared to the examples, and had deficient adhesion, and adhesion after the weather resistance test, and Comparative Examples 4 and 8 had poor adhesion after the weather resistance test. In addition, in Comparative Examples 2 and 6, gelation occurred after preparation, and the stability of the coating solution for hard coat (coating composition) cannot be said to be sufficient.

INDUSTRIAL APPLICABILITY

An optical member having a cured film formed from the coating composition of the present invention can be used for camera lenses, vehicle window glasses, and optical filters attached to liquid crystal displays or plasma displays, for example, in addition to spectacle lenses.

The invention claimed is:

1. A coating composition, comprising
a component (S): organosilicon compounds and/or a silicon-containing substance which is a hydrolyzate thereof; and
a component (T): modified metal oxide colloid particles (C) having an average particle diameter of 2 to 100 nm, wherein the component (T) modified metal oxide colloid particles (C) is colloid particles of an oxide of at least one metal selected from the group consisting of Ti, Fe, Cu, Zn, Y, Zr, Nb, Mo, In, Sn, Sb, Ta, W, Pb, Bi and Ce, in which surfaces of the colloid particles are coated with colloid particles of an oxide of one or more atoms selected from the group consisting of Si, Al, Sn, Zr, Mo, Sb and W,
wherein the organosilicon compounds of the component (S) include
a component (S1): an organosilicon compound which is at least one organosilicon compound selected from the group consisting of compounds of the following Formula (I) and compounds of the following Formula (II), and which does not have a nitrogen-containing heterocyclic structure,

$(R^1)_a(R^3)_b Si(OR^2)_{4-(a+b)}$      (I)

wherein in Formula (I),
$R^1$ is a monovalent organic group having an epoxy group, an acryloyl group, a methacryloyl group, a mercapto group, a ureido group, an amino group or a cyano group,
$R^3$ is an alkyl group,
$R^1$ and $R^3$ are each an organic group which is bonded to a silicon atom via an Si—C bond,
$R^2$ is a $C_{1-8}$ alkyl group, aryl group, aralkyl group, alkoxyalkyl group, or acyl group,
a and b are each independently an integer of 0, 1, or 2, and
a+b is an integer of 0, 1, or 2,

$[(R^4)_c Si(OX)_{3-c}]_2 Y$      (II)

wherein in Formula (II),
$R^4$ is a $C_{1-5}$ alkyl group,
X is a $C_{1-4}$ alkyl group or acyl group,
Y is a methylene group or a $C_{2-20}$ alkylene group, and
c is an integer of 0 or 1, and
a component (S2): an organosilicon compound which is an organosilicon compound of the following Formula (III), and which has a nitrogen-containing heterocyclic group,

Formula (III)
$(R^7-R^6)_n-Si(OR^5)_{(4-n)}$ wherein in Formula (III),
$R^5$ is a $C_{1-8}$ alkyl group, alkoxyalkyl group, or acyl group,
$R^6$ is a methylene group or a $C_{2-20}$ alkylene group,
$R^7$ is a nitrogen-containing heterocyclic group containing 1 to 3 nitrogen atoms, and
n is an integer of 1 to 3.

2. The coating composition according to claim 1, wherein $R^7$ is a nitrogen-containing heterocyclic group which has 5 to 30 ring-forming atoms.

3. The coating composition according to claim 1, wherein a nitrogen-containing heterocycle in the nitrogen-containing heterocyclic group is a pyrrole ring, a pyrrolidone ring, an indole ring, an indoline ring, a carbazole ring, a pyridine ring, a piperidine ring, a pyrimidine ring, a quinoline ring, a pyrazole ring, an imidazole ring, an imidazoline ring, an imidazolidine ring, a benzimidazole ring, a triazole ring, a benzotriazole ring, or a triazine ring.

4. The coating composition according to claim 1,
wherein a mass proportion of the component (S2) contained is 3 to 1,200 parts by mass with respect to a total mass of 100 parts by mass of the component (S1).

5. The coating composition according to claim 1,
wherein a proportion of the component (S) contained is 25 to 300 parts by mass with respect to 100 parts by mass of the modified metal oxide colloid particles of the component (T).

6. The coating composition according to claim 1,
wherein the modified metal oxide colloid particles (C) are comprised of metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

7. The coating composition according to claim 6,
wherein in the modified metal oxide colloid particles (C), one or more intermediate thin film layers formed of any one of a single oxide of at least one of atoms selected from the group consisting of Si, Al, Sn, Zr, Sb, Nb, Ta and W, a composite oxide of two or more of atoms selected from the same group, or a mixture of the single oxide and the composite oxide are interposed between the metal oxide colloid particles (A) nuclei and the inorganic oxide colloid particles (B) coating.

8. The coating composition according to claim 6,
wherein the modified metal oxide colloid particles (C) are obtained by bonding the organosilicon compound of the component (Si) to at least a part of the surface.

9. The coating composition according to claim 8,
wherein the organosilicon compound is an organosilicon compound having a ureido group.

10. The coating composition according to claim 6,
wherein the metal oxide colloid particles (A) are composite oxide colloid particles which contain a Ti oxide as a main component and further contain an oxide of one or more metals selected from the group consisting of Fe, Cu, Zn, Y, Zr, Nb, Mo, In, Sn, Sb, Ta, W, Pb, Bi and Ce.

11. The coating composition according to claim 6,
wherein the inorganic oxide colloid particles (B) are colloid particles of an oxide of one or two or more atoms selected from the group consisting of Si, Al, Sn, Zr, Mo, Sb and W.

12. The coating composition according to claim 1, further comprising
one or two or more curing catalysts selected from the group consisting of a metal salt, a metal alkoxide and a metal chelate compound.

13. An optical member having a cured film formed from the coating composition according to claim 1 on the surface of an optical substrate.

14. The optical member according to claim 13, further comprising an anti-reflective coating on the surface of the cured film formed on the surface of the optical substrate.

* * * * *